(12) United States Patent
Folkert et al.

(10) Patent No.: US 8,996,502 B2
(45) Date of Patent: Mar. 31, 2015

(54) USING JOIN DEPENDENCIES FOR REFRESH

(75) Inventors: Nathaniel Keith Folkert, San Francisco, CA (US); Abhinav Gupta, Menlo Park, CA (US); Andrew Witkowski, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2618 days.

(21) Appl. No.: 11/083,830

(22) Filed: Mar. 18, 2005

(65) Prior Publication Data

US 2006/0047622 A1 Mar. 2, 2006

Related U.S. Application Data

(60) Provisional application No. 60/572,138, filed on May 17, 2004.

(51) Int. Cl.
*G06F 7/00* (2006.01)
*G06F 17/30* (2006.01)

(52) U.S. Cl.
CPC .... *G06F 17/30457* (2013.01); *G06F 17/30451* (2013.01)
USPC ............ 707/717; 707/609; 707/741; 707/802

(58) Field of Classification Search
USPC ......................................................... 707/201
See application file for complete search history.

(56) References Cited

U.S. PATENT DOCUMENTS

| | | | |
|---|---|---|---|
| 4,773,862 A | 9/1988 | Baba | |
| 5,325,525 A | 6/1994 | Shan et al. | |
| 5,574,900 A | 11/1996 | Huang et al. | |
| 5,765,147 A | 6/1998 | Mattos et al. | |
| 5,778,353 A | 7/1998 | Schiefer et al. | |
| 5,822,751 A | 10/1998 | Gray et al. | |
| 5,963,959 A | 10/1999 | Sun et al. | |
| 6,026,390 A | 2/2000 | Ross et al. | |
| 6,125,360 A | 9/2000 | Witkowski et al. | |
| 6,134,543 A | 10/2000 | Witkowski et al. | |
| 6,205,451 B1 | 3/2001 | Norcott et al. | |
| 6,272,502 B1 | 8/2001 | Lieuwen et al. | |
| 6,289,335 B1 | 9/2001 | Downing et al. | |

(Continued)

FOREIGN PATENT DOCUMENTS

JP 05104972 4/1993

OTHER PUBLICATIONS

"Oracle 9i Materialized Views" An Orace White Paper (May 2001).*

(Continued)

*Primary Examiner* — Hosain Alam
*Assistant Examiner* — Bruce Witzenburg
(74) *Attorney, Agent, or Firm* — Hickman Palermo Becker Bingham LLP

(57) ABSTRACT

In an embodiment, Partition Change Tracking (PCT) refresh is performed by using join dependencies on partitioning columns to derive and fill in identifiers of rows and/or partitions containing the rows in the refresh expressions. In an embodiment, the join dependencies that form the Materialized View's (MV's) query definition and the partitioning predicate of the table are used to automatically generate a statement which is run in order to derive and fill in identifiers of the rows and/or partitions that are being changed. The identifiers are then plugged into the refresh expression, and the refresh expression is run. Running the refresh expression causes the rows identified to be refreshed.

20 Claims, 3 Drawing Sheets

(56) References Cited

U.S. PATENT DOCUMENTS

| | | | |
|---|---|---|---|
| 6,334,128 B1* | 12/2001 | Norcott et al. | 707/5 |
| 6,339,769 B1 | 1/2002 | Cochrane et al. | |
| 6,356,889 B1 | 3/2002 | Lohman et al. | |
| 6,356,890 B1 | 3/2002 | Agrawal et al. | |
| 6,356,891 B1 | 3/2002 | Agrawal et al. | |
| 6,374,263 B1 | 4/2002 | Bunger et al. | |
| 6,457,020 B1 | 9/2002 | Carey et al. | |
| 6,473,201 B1 | 10/2002 | Sato | |
| 6,477,525 B1 | 11/2002 | Bello et al. | |
| 6,493,699 B2 | 12/2002 | Colby et al. | |
| 6,493,701 B2 | 12/2002 | Ponnekanti | |
| 6,496,819 B1 | 12/2002 | Bello et al. | |
| 6,496,828 B1 | 12/2002 | Cochrane et al. | |
| 6,560,476 B1 | 5/2003 | Pelletier et al. | |
| 6,629,094 B1 | 9/2003 | Colby et al. | |
| 6,741,997 B1 | 5/2004 | Liu et al. | |
| 6,748,392 B1 | 6/2004 | Galindo-Legaria et al. | |
| 6,763,352 B2 | 7/2004 | Cochrane et al. | |
| 6,882,993 B1 | 4/2005 | Lawande et al. | |
| 6,957,225 B1 | 10/2005 | Zait et al. | |
| 7,007,006 B2 | 2/2006 | Zilio et al. | |
| 7,111,020 B1 | 9/2006 | Gupta et al. | |
| 7,158,994 B1 | 1/2007 | Smith et al. | |
| 2001/0013030 A1 | 8/2001 | Colby et al. | |
| 2003/0093415 A1 | 5/2003 | Larson et al. | |
| 2003/0135480 A1 | 7/2003 | Van Arsdale et al. | |
| 2003/0159136 A1* | 8/2003 | Huang et al. | 717/171 |
| 2003/0200218 A1 | 10/2003 | Tijare et al. | |
| 2004/0122828 A1* | 6/2004 | Sidle et al. | 707/100 |
| 2005/0055382 A1 | 3/2005 | Ferrat et al. | |

OTHER PUBLICATIONS

U.S. Appl. No. 10/006,605, filed Dec. 5, 2001.
Harumi A. Kuno and Elke A. Rundensteiner (1996), Using Object-Oriented Principles to Optimize Update Propagation to Materialized Views, pp. 310-317.
U.S. Appl. No. 10/107,106, filed Mar. 26, 2002.
Kuno et al., Incremental Maintenance of Materialized Object-Oriented Views in MultiView: Strategies and Performance Evaluation, IEEE Transactions on Knowledge and Data Engineering, vol. 10, Issue 5, Sep.-Oct. 1998, pp. 768-792.
Al-Anzi, Fawas S. et al., "Modeling behavior, a Step Towards Defining Functionally Correct Views of Complex Objects in Concurrent Engineering", CIKM '94. Gaitherburg MD, USA, 1994 ACM 089791-674-3, pp. 1-9.
Gopalkrishnand, Vivikanand, et al. "Issues of Object-Relational View Design in Data Warehousing Environment," IEEE 1998, 0780347781, pp. 2732-2737.
Kung, Chenho, "Object Subclass Hierarchy in SQL: A Simple Approach," Communications of the ACM, Jul. 1990, vol. 33, No. 7, pp. 117-125.
Liu, Jixue et al., "Incremental maintenance of Nested Relational Views," School of Computer and Information Science, The University of South Australia, pp. 197-205.
Randall G. Bello, et al., "Materialized View in Oracle", VLDB '98, Proceedings of the 24th International Conference on Very Large Data Bases, Aug. 24-27, 1998, New York City, New York, USA, pp. 659-664.
Faiza Najjar, et al., "Cardinality estimation of distributed join queries," Sep. 1-3, 1999; Database and Expert Systems Applications, 1999, Proceedings, Tenth International Workshop on, pp. 66-70.
Gianluca Moro, et al., "Incremental maintenance of multi-source views," Database Conference, 2001, ADC 2001, Proceedings, 12th Australasian, Jan. 2001, pp. 13-20.
Gopalkrishnand, Vivikanand, et al., "Issues of Object-Relational View Design in Data Warehousing Environment", IEEE 1998, pp. 2732-2737.
Kung, Chenho, "Object Subclass Hierarchy in SQL: A Simple Approach", Communications of the ACM, Jul. 1990, vol. 33, No. 7, pp. 117-125.
Bello, Randall G., et al., "Materialized Views in Oracle", VLDB 1998, Proceedings of 24th International Conference on Very Large Databases, Aug. 24-27, 1998, pp. 659-664.
Najjar, Faiza, et al., "Cardinality estimation of distributed join queries", Database and Expert Systems Applications, Proceedings of the Tenth International Workshop, dated Sep. 1-3, 1999, pp. 66-70.
Moro, Gianluca, et al., "Incremental maintenance of multi-source views", Database Conference, 2001, ADC 2001, Proceedings, 12th Australasian, Jan. 2001, pp. 13-20.
West, Douglas B., et al., "Introduction to Graph Theory Second Edition", Prentice Hall, 2001, 6 pages.
U.S. Appl. No. 11/083,804, filed Mar. 18, 2005.
Mistry et al, "Materialized View Selection and Maintenance Using Multi-Query Optimization," IIT-Bombay Bell Labs Univ. of Massachusetts-Amherst (Jun. 2001).
Lane, Paul, et al., "Oracle9i Data Warehousing Guide (title pages)", Release 2 (9.2), Part No. A96520-01, retrieved from internet : http://download.oracle.com/docs/cd/B10501_01/server.920/a96520/title.html, Mar. 2002, 2 pages.
Lane, Paul, et al., "Oracle9i Data Warehousing Guide—Chapter 8, Materialized Views", Release 2 (9.2), Part No. A96520-01, retrieved from internet : http://download.oracle.com/docs/cd/B10501_01/server.920/a96520/mv.html, Mar. 2002, 41 pages.
U.S. Appl. No. 11/084,416, filed Mar. 18, 2005.
United Stated Patent and Trademark Office, Decision on Appeal, in U.S. Appl. No. 11/084,174 dated Apr. 29, 2013, 8 pages.
U.S. Appl. No. 11/437,072, filed Mar. 19, 2006.
U.S. Appl. No. 11/437,072, filed May 19, 2006.
U.S. Appl. No. 11/084,174, filed Mar. 18, 2005, Office Action, mailed Aug. 29, 2013.
U.S. Appl. No. 11/084,174, Filed Mar. 18, 2005, Advisory Action, mailed May 29, 2014.

* cited by examiner

# USING JOIN DEPENDENCIES FOR REFRESH

RELATED APPLICATIONS

This application claims priority benefit from U.S. Provisional Application No. 60/572,138, filed May 17, 2004, entitled, "USING JOIN DEPENDENCIES FOR REFRESH", the entire contents of which are hereby incorporated by reference as if fully set forth herein under 35, U.S.C. §119(e).

This application is related to U.S. patent application Ser. No. 11/084,416, entitled, "USING ESTIMATED COST TO REFRESH A SET OF MATERIALIZED VIEWS (MVS)", filed on Mar. 18, 2005, the entire contents of which are hereby incorporated by reference.

This application is related to U.S. patent application Ser. No. 11/084,331, entitled, "USING ESTIMATED COST TO SCHEDULE AN ORDER FOR REFRESHING A SET OF MATERIALIZED VIEWS (MVS)", filed on Mar. 18, 2005, the entire contents of which are hereby incorporated by reference.

This application is related to U.S. patent application Ser. No. 11/083,804, entitled, "CHOOSING WHETHER TO USE A DELAYED INDEX MAINTENANCE DEPENDING ON THE PORTION OF THE MATERIALIZED VIEW (MV) CHANGED", filed on Mar. 18, 2005, the entire contents of which are hereby incorporated by reference.

This application is related to U.S. patent application Ser. No. 11/084,174, entitled, "ALLOCATING CPU RESOURCES FOR A PARTICULAR REFRESH SCHEDULE", filed on Mar. 18, 2005, the entire contents of which are hereby incorporated by reference.

FIELD OF THE INVENTION

The invention relates to Materialized Views (MVs) in general. More specifically, the invention relates to refreshing MVs.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, the problems identified with an approach should not be assumed to have been recognized in the prior art, unless otherwise indicated.

In a Database Management System (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

A group of changes to a database managed by a DBMS that must be made together are often referred to as a "transaction". A group of changes that must be made together are referred to as being performed "atomically". In performing a transaction, in many database systems, the changes made to the database prior to all the changes of the transaction have been performed are stored in a log, so that if it is determined that the transaction cannot be completed, the changes of the transaction that have been performed may be undone. A transaction in which all of its changes have been successfully completed may be said to have "committed". The log used for storing the changes associated with the transaction before the transaction has committed, is often referred to as the "undo log".

Databases use various types of logical storage units to store rows of a table, each type corresponding to a level of granularity. Typically, the logical storage unit at the lowest level of granularity is a data block. In database systems that support table partitioning, a logical storage unit at a higher level of granularity than a datablock is a "table partition".

In table partitioning, a database table is divided into sub-tables, which are table partitions. One form of partitioning is referred to as range partitioning. With range partitioning, each individual partition corresponds to a particular range of values for one or more columns (partition keys) of the table. All rows that fall into the range associated with a partition are entirely contained within that partition.

Views and Materialized Views

When a database management system contains very large amounts of data, certain queries against the database can take an unacceptably long time to execute. A view is a response to a predefined query that is treated as a table. A view is a virtual table, and a view may be referenced by a database statement as if the view were an actual table. The tables in which the data is actually stored are base tables. The base tables are referenced directly or indirectly by a predefined query. To generate the rows of a view data is extracted and derived from the base tables.

A Materialized View (MV) is a view for which the results of the predefined query are stored as precomputed values. A MV is the stored version of the virtual table created by a view. By materializing MVs, in this way, queries that take a long time to compute do not have to be executed multiple times, and consequently the data can be accessed faster and more efficiently.

Operations on the database containing the base tables from which the MV was created do not directly affect the MV. Thus, after performing one or more database operations a MV may need to be refreshed to reflect the changes made to the database.

Each MV may have its own refresh method. The query that defines the MV may determine which of the refresh methods to apply. To refresh an MV a refresh expression may be executed. A refresh expression is one or more database statements, executed to refresh an MV, which may either remove rows of an MV that need to be updated, and/or recompute and insert rows. The updated data may be taken from other tables. A rewrite is refreshing a portion of a first MV (e.g., using a refresh expression) by using a portion of a second MV. The second MV is one of the tables used in the refresh expression of the rewrite. During the rewrite portions of base tables may or may not be used in addition to the portions of the second MV for refreshing the first MV.

Various Ways of Refreshing Mvs

There are a variety of different ways for refreshing MVs that are often provided, such as a complete refresh, a fast refresh, or a forced refresh. In a complete refresh, the entire MV is rebuilt from scratch. In a fast refresh, only the data changes are applied to refresh the MV. A fast refresh may be referred to as an incremental refresh. Similarly, the changes to the MV during the fast refresh may be said to be applied "incrementally", because, in a fast refresh, a subset of the rows of the MV are replaced rather than re-computing the entire MV.

There are several varieties of fast refresh, such as conventional fast refresh, Partitioned Change Tracking (PCT) fast refresh using TRUNCATE, and PCT fast refresh using DELETE. In a conventional fast refresh, MV logs are kept for each of the base tables. The MV logs are used to construct the changes on the MV that correspond to the changes made on the base tables. Undo logs may be used as the MV logs. However, MV logs are typically stored in a manner that facilitates being queried. The MV logs track changes made to the base table that are relevant to the MV. To find which rows to apply the computed changes, the changes that need to be applied to the MV are joined to the original MV.

In any of the PCT fast refresh methods, at least one of the base tables has been partitioned, and the MV logs track the changes to the partition base table at the same hierarchical level as the partition. A data object, such as a table, may be divided up into multiple sub-tables referred to as "partitions" that are stored and indexed separately. In a PCT fast refresh, the rows being modified may be found using simple predicates on only the relevant partitions, which does not cost as much as the joins necessary for computing a conventional fast refresh. In order to perform either type of PCT fast refresh, at least one of the base tables for the MV must be partitioned.

The PCT fast refresh using TRUNCATE erases an entire partition within the MV, and recalculates or rewrites each row of the partition that was erased. No log is kept of the records in the partition that are erased during the truncation. The truncation operation is typically irreversible. In order to perform a PCT fast refresh using TRUNCATE, the MV must be partitioned in a manner related to the partitions in the base tables (in addition to having one of the base tables partitioned). The truncation operation is not dependent on the number of rows erased, and is fast relative to a row-by-row delete operation. However, the recalculation of the all the rows deleted may have a high cost.

The PCT fast refresh using DELETE deletes selected rows of an entire partition within the MV, and recalculates or rewrites the rows deleted. The PCT fast refresh using DELETE uses a delete operation, which enters the deleted row in a log of the operations performed. The PCT fast refresh using DELETE does not require the MV to be partitioned.

Each of the fast refresh methods are possible only in certain scenarios. Specifically, a conventional fast refresh is possible if the only operations performed on the base tables were DML operations specified in database statements. For example, if Partition Maintenance Operations (PMOPs) were performed on the base tables, a conventional fast refresh is not possible, because if any PMOPs were performed, the base table changes are not available in the MV logs. In PMOPs are operation that update an index to reflect changes to a table upon which the index is based. If a PMOP occurred only a PCT fast refresh or complete refresh may be performed. PCT fast refresh can be used both in the presence of DMLs on base tables and PMOPs on partitioned tables.

However, MV logs may be large and take a significant amount of time to search. Additionally, PCT fast refresh involves joining the change in the MV to the MV, which may be computationally expensive. Thus, a PCT fast refresh can take a significant amount of time, because of the computational expense associated with searching the MV log tables, computing the changes to the MV from the MV logs, and computing the join operations for joining the change in the MV to the MV.

In view of the above, it is desirable to lower the computational cost of performing PCT fast refresh operations.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
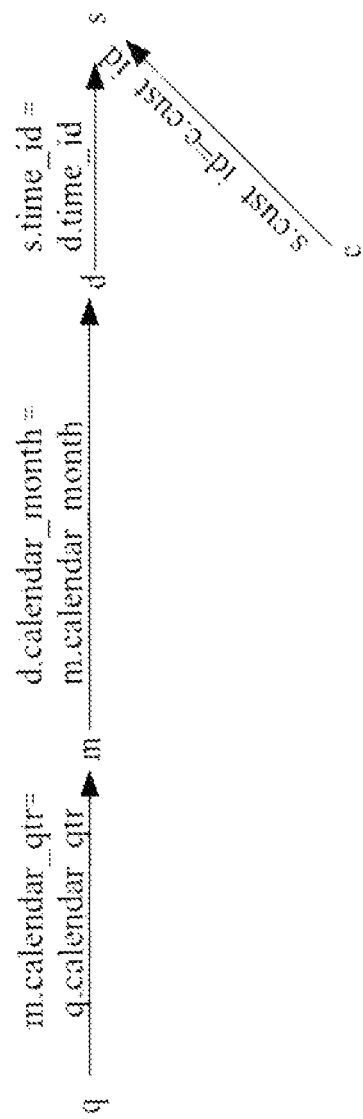
FIG. 1 is an example of a dependency graph.

A method and apparatus for using join dependencies refreshing a set of one or more materialized views is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature may not address any of the problems discussed above or may only address one of the problems discussed above. Some of the problems discussed above may not be fully addressed by any of the features described herein. Although headings are provided, information related to a particular heading, but not found in the section having that heading, may also be found elsewhere in the specification.

Nomenclature

Lineage

A hierarchical lineage (which will be referred to as a "lineage") is the set of all columns participating in the hierarchy "levels". For example, for the tuple (year, quarter, month), the lineage for the month level is (year, quarter, month), the lineage for the quarter level is (year, quarter), the lineage for the year level is (year).

Equivalent Tables

In a query definition, a set of partitioned detail tables that are joined on all the top hierarchical level columns of partitioning or on all the partitioning columns are called equivalent tables. For example, consider the query, Q1, below.

Q1

SELECT t.calendar_, year, c.cust_, city

FROM sales s, times t, customer c

WHERE s.time_, id=t.time_, id AND s.cust_, id=c.cust_, id

The sales table and the times table are equivalent if they are both partitioned into different ranges of values and/or a list of values on time_, id and the partitions match exactly. An example of a situation in which the times table and sales table are equivalent is if the sales table and times table are both partitioned into partitions that each contain a range of values for the time_, id corresponding to same the three-month periods. Similarly, the sales table and the customer table are equivalent if they are both partitioned into different ranges of values and/or a list of values on cust_, id. For example, if both the sales table and customer table are partitioned in a way in which each partition contains all customers having cust_, id corresponding to the last names beginning with the same letter of the alphabet. In an embodiment, equivalent tables may be joined on their partitioning keys in the MV definition and have partitions that match the partition keys.

Join Dependent Tables and Mapping Tables

An expression on a select list of a query is "join dependent" or has a "join dependency" if it is reachable from the partitioning column based on the join graph of the query. Any expressions that can be reached via graph G from this join is called join dependent on s.col1-s.coln. For example, consider a query involving the tables sales, time_, day, time_, mon, time_, qtr and customer, in which the sales table is partitioned by time_, id, such as the query Q2, below.

Q2

SELECT m.calendar_, month, q.calendar_, quarter, c.cust_, city, SUM(amount_, sold) sum_, amt
FROM sales s, times_, day d, times_, mon m, times_, qtr q, customer c
WHERE s.time_, id=d.time_, id AND
d.calendar_, month=m.calendar_, month AND
m.calendar_, qtr=q.calendar_, qtr AND
s.cust_, id=c.cust_, id
GROUP BY m.calendar_, month, q.calendar_, quarter, cust_, city;

The above query produces a sum of the amounts sold for each unique combination of values for m.calendar_, month, q.calendar_, quarter, cust_, city. Each of these sums may be referred to as a GROUP BY aggregation.

FIG. 1 shows a graph of the join dependencies for the above statement, query Q2. In FIG. 1 letters m, q, d, s, and c represent the tables represented in the above statement by the same letters. Tables m, q, d, s, and c are connected by arrows representing join operations. Above each arrow is one of the predicates of the above database statement that is used in the join operation represented in the arrow. As illustrated in the graph of FIG. 1, the m.calendar_, month and q.calendar_, quarter columns are join dependent on s.time_, id, because the m.calendar_, month and q.calendar_, quarter columns can be reached in the join graph from the s.time_, id column. The tables (e.g., q and d) on the path that joins the join dependent table (e.g., m) to the table upon which it is join dependent (e.g., s) are referred to as mapping tables.

There are many ways in which MVs may be computed, which include at least Materialized Aggregate Views (MAVs) and Materialized Join Views (MJVs). MJVs are formed by joining rows from a plurality of base tables, MAVs are formed by aggregating values taken form one or more base tables. Although the examples that are illustrated use MAVs, similar expressions may also be generated for many other types of MVs, such as MJVs.

Overview

In an embodiment, PCT refresh is performed by using join dependencies on partitioning columns to derive and fill in identifiers of rows and/or partitions containing the rows in the refresh expressions. In an embodiment, the join dependencies that form the MV's query definition and the partitioning predicate of the table are used to automatically generate a statement which is run in order to derive and fill in identifiers of the rows and/or partitions that are being changed. The identifiers are then plugged into the refresh expression, and the refresh expression is run. Running the refresh expression causes the rows identified to be refreshed. If the partitions containing the rows are identified instead of the actual rows, the entire partition is refreshed, thereby also refreshing the rows of interest.

A join dependent refresh may be performed via a PCT refresh using TRUNCATE or a PCT refresh using DELETE, for example. In an embodiment, in performing the join dependent refresh, first the rows of interest or the partitions containing the rows of interest are removed from the MV. Next, updated versions of the rows of interest are computed. Finally, the updated versions of the rows of interest are inserted into the MV. For a PCT refresh using DELETE, just the updated version of the rows are computed and inserted. For a PCT refresh using TRUNCATE the entire partition containing the rows of interest are computed and inserted, which thereby updates the rows of interest.

In an embodiment, partitioning must be performed on the top level range or list. The top level ranges or list are the ranges or list of partitioning values that form the major partitions, which are not sub-partitions within other partitions. When partitions are added, deleted, or updated in detail tables, the rows in an MV that are affected can be determined by using join dependent expressions on a select list of the MV.

Examples of Situations in Which a Join Dependent Refresh May Be Performed

A join dependency based PCT refresh (which will be referred to as a join dependent refresh) is possible when the MV has in its SELECT statement a list of expressions that have a join dependency on the partitioning column of a changed fact table, for example. The list of expressions in the SELECT statement may be referred to as the select list. In an embodiment, in a join dependent refresh, the expressions in the select list that have a join dependency on the partitioning column of the changed fact table should only come from columns of tables that have not changed. If the expressions in the select list that have a join dependency on the partitioning column come from columns of tables that have changed, it may be difficult to identify the changed rows in the MV if there has been a TRUNCATE operation on any-of the dimension tables involved in the join. In the above example, the fact table, which is the sales table, changes. The mapping tables, which are times_, day, times_, mon, times_, qtr, do not change. Thus, in this embodiment, if Q2 is used to form an MV, a join dependent refresh may be performed, because the mapping tables have not changed.

A function operating on a partitioning column is also a form of a join dependent expression. Consequently, a join dependent refresh may also be performed when there is a known function, such as intrinsic function TO_, CHAR or TRUNC, is being called by the MV and is operating directly on a partitioning column of a detail table in the select list of the query defining the MV (TO_, CHAR converts data using a national language character set to data using the equivalent character set used by the database, and TRUNC truncates a number, by discarding the least significant digits first, to form a number of a specified number of decimal places).

For example, consider an MV based on the query, Q3, below.

Q3

SELECT m.calendar_, month, q.calendar_, quarter, c.cust_, city,
TRUNC(SUM(amount_, sold),2) sum_, amt
FROM sales s, times_, day d, times_, mon m, times_, qtr q, customer c
WHERE s.time_, id=d.time_, id AND
d.calendar_, month=m.calendar_, month AND
m.calendar_, qtr=q.calendar_, qtr AND
s.cust_, id=c.cust_, id GROUP BY m.calendar_, month, q.calendar_, quarter, cust city;

In the above query, the sum_, amt is truncated to two significant digits. A join dependent refresh could be performed despite the sum_, amt being truncated. Similarly, a join dependent refresh can be performed if a fact table, F, is partitioned on a date column, day, and the materialized view contains the expression TRUNC(day, MONTH). Also as another example, a join dependency based refresh can be performed if the materialized view contains a TO_, CHAR or TRUNC expression on a date/timestamp column as long as the format selects day, month, or year levels.

To summarize, in an embodiment, a PCT refresh is performed if (1) the MV contains partitioning column of each of the detail tables that have changed, (2) the MV contains at least some expression that has a join dependency on the partitioning columns of each of the changed tables, but the tables that are involved in mapping the partitioning column of the detail tables have not have changed, or (3) the MV contains recognizable functions performed directly on the partitioning column of the changed detail table.

The mapping tables may be dimension tables, which are relatively stable in that the dimension tables are changed less frequently than the fact tables. In an embodiment, if a mapping table changes, the refresh of the MV before changes to a fact table were applied should be performed separately from when the refresh after the changes to fact the tables were applied. By performing the two refreshes separately, it may still be possible to use a join dependent refresh, if at the time that the fact table changes, the mapping tables have not changed yet.

In an embodiment, if the MV has a GROUP BY aggregation, then join dependent expressions that produce null values that result from a ROLLUP (e.g., the nulls produced from a clause such as GROUP BY ROLLUP (m.calendar_, month, cust_, city)) or a grouping of sets are disqualified, because the null values (e.g., the null values in front of the grand total produced by GROUP BY ROLLUP (m.calendar_, month, cust_, city)) resulting from rollups are not used for carrying the join dependency. The null values become constants for some groupings. The null values produced by a GROUP BY of recognizable functions (e.g., intrinsic functions) are not used for carrying the join dependency.

In addition, if there is at least one expression that is common to all of the PARTITION BY sub-clauses of a window or spreadsheet, a join dependency based refresh can be performed even if the MV contains a window function or a spreadsheet clause. In addition, a join dependent refresh may be performed when a DISTINCT aggregation is in the select list.

Making the Determination to Perform a Join Dependent Refresh

In an embodiment, a determination as to whether a join dependent refresh is performed when an MV is defined. In an alternative embodiment, only a determination of whether a join dependent refresh is performable is determined at the time that the MV is defined. When it is time to refresh the MV an estimate is made as to whether a join dependent refresh is expected to be the most efficient refresh of a set of manner of refreshing the MV. If the join dependent refresh is expected to be the most efficient, then the join dependent refresh is used. Otherwise, the refresh method that is estimated to be the most efficient is used. See U.S. patent application No. 60/562, 401entitled, "USING OPTIMIZER COST TO REFRESH A SET OF MATERIALIZED VIEWS", for a more complete discussion of choosing a refresh method based on cost.

The MV may be marked to indicate that the MV is join dependent refreshable in MV meta-data, which is metadata maintained by a database server that describes MVs. The detail tables that enable PCT refresh that may be used by the join dependent refresh may also be marked appropriately to indicate that the detail tables may be used as a mapping table for the join dependent refresh. In an alternative embodiment, when the MV is defined or upon refreshing an MV, the MV is analyzed as to whether a join dependent refresh may be performed.

A Join Dependent Refresh Mechanism

Figure 2:
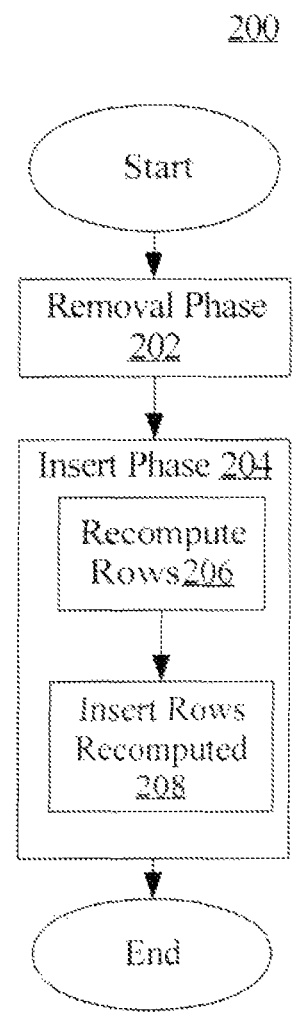
FIG. 2 is a block diagram of a flowchart of an embodiment of a method of performing a join dependent refresh.

FIG. 2 is a block diagram of a method 200 of implementing a join dependent refresh. An algorithm may be constructed for performing a join dependent refresh in which the join dependent refresh is a variation of or an extension of a PCT refresh. The Join dependent refresh may include two phases. As the first phase, in step 202, a removal phase is performed, which removes at least the rows in the MV that are affected by the changes to the base tables. The removal of the rows may be performed by deleting only the rows that are affected by the changes on the base tables, or may be removed via a TRUNCATE operation on a partition. When performing the removal phase by only removing the deleted rows, the removal phase may be referred to as a delete phase, and when performing the removal phase a TRUNCATE operation, the removal phase may be referred to as a truncate phase. At the second phase, in step 204, an insert phase is performed, which in an embodiment includes two sub-steps. In sub-step 206, the at least rows removed from the MV are recomputed, and in sub-step 208 the rows that were recomputed are inserted the MV.

In performing the refresh, during both the removal phase of step 202 and optionally during the insert phase of step 204, a predicate is applied to the partitioned fact table in order to identify the changed rows for the refresh statements. Additionally, a predicate may be generated that enables partition pruning on the fact tables. During partition pruning, when searching for rows that need to be refreshed, for example, the database management system uses the partitioning to avoid scanning every row in the equivalent tables and mapping tables. The rows being scanned are restricted to a set of partitions that include the rows of interest. For example, if a row associated with a particular date needs to be refreshed and if the table is partitioned into sets of ranges of dates, then using partition pruning the only rows that are scanned are those rows in the partition having the range that includes the date of the row in need of being refreshed.

Join Dependent Refresh Using Delete

When using a PCT refresh using DELETE to perform the join dependent refresh, during the delete phase a sub-query predicate on the detail tables is used to compute the affected rows in the materialized view. The DELETE operation removes the rows that have been determined by the sub-query predicate to be affected by the changes to the base table. In an embodiment, a sub-query predicate is also used during the insert phase to compute the affected rows in the materialized view. The sub-query predicate used during the insert and delete phases may be the same expression. Alternatively, the affected rows computed during the delete phase are used as or used to determine the affected rows that need to be computed during the insert phase without running the same predicate twice. In an embodiment, the sub-query predicate has the following syntax.

```
(<exp_list>) IN
    (SELECT <exp_list>
    FROM <tab_list>
    WHERE <join_pred> AND <part_pred>)
```

In this statement, <exp_, list> is a list of non-rolled up expressions in the SELECT list of the MV that have a join dependency on the partitioning columns of the changed fact table. The IN operator identifies the partitions in MVs that will be altered by an INSERT, DELETE, or TRUNCATE operation, for example. The input <tab_, list> is a list of tables whose expressions are referenced in <exp_, list> and other tables that link the tables of the <exp_, list> to the changed fact tables. The input <join_, pred> is a predicate that joins the tables in <tab_, list>. The input <part_, pred> is a set of one or more predicates that identify the changed partitions in the detail table. In an embodiment, there is one <part_, pred> predicate generated for each of the changed fact tables that are partitioned.

In an embodiment, the predicates corresponding to changed equivalent tables are connected by an AND operator, but the predicates corresponding to other tables are connected by an OR operator. If two tables are equivalent, it means that these two tables are joined on partitioning columns and the portion of the MV that needs to be recomputed corresponds to the intersection of changed rows in the equivalent tables. The join operation corresponds to an intersection or AND predicate, implying that the equivalent tables are connected with an AND predicate.

Optimizations While Running the Sub-Query Predicate

In an embodiment, if all the predicates in <part_, pred> (identifying changed partitions) are connected by ANDs, partition pruning is performed on each of the tables corresponding to each of the predicates to shorten the search of the rows that need to be refreshed.

The partition pruning may be forced by using a hint. In an embodiment, the hint may have the syntax SUBQ_, DYN_, PRUNE(*) (<part_, tab> <tab_, list>), where <part_, tab> is the table on which partition pruning is being forced, and <tab_, list> is the list of tables on which the predicate is being considered. The <tab_, list> tables are directly or indirectly joined to the partitioned tables listed in <part_, tab>. A generic hint may be used having the following syntax, for example.

SUBQ_, DYN_, PRUNE(*);

The generic hint may be used for exploring all possibilities of dynamic partition pruning possibilities and force partition pruning possibilities for all of the <part_, tab> tables.

If the key values of the sub-query in the "IN sub-query" predicate are not correlated, the IN sub-query may be automatically converted into a HASH SEMI JOIN, which may be more efficient than the uncorrelated execution of the IN sub-query. The hash semi join applies a hashing algorithm to a key, which in the IN sub-query may be the join key, and creates a hash table correlating the hash values to row IDs. Searching the hash values of the key is more efficient than searching the actual key, because of the fixed length of the hash values.

Materialized View with a Level from a Denormalized Dimension

Consider the example of the MV "ru_, cube_, quarter_, mv", MV1. The MV ru_, cube_, quarter_, mv is a rolled up cube, which is defined in the following database statements.

```
MV1
CREATE MATERIALIZED VIEW ru_cube_quarter_mv
PARTITION BY RANGE (quarter)
(
    partition P98Q1 values less than '1998-Q1',
    partition P98Q2 values less than '1998-Q2',
    ....
)
AS
    SELECT
        calendar_year year, calendar_quarter_desc quarter,
        cust_state_province state, cust_city city,
        sum(amount_sold) sum_amt,
        grouping_id (calendar_year, calendar_quarter_desc,
        cust_state_province, cust_city) gid
    FROM sales s, times t, customer c
    WHERE s.time_id=t.time_id AND s.cust_id=c.cust_id
    GROUP BY
        calendar_year, calendar_quarter_desc,
        rollup(cust_state_province, cust_city);
```

The CREATE clause identifies the name of the MV being created as ru_, cube_, quarter_, mv, and initiates the creation of the MV. The data within the MV will have the data organized into partitions that are distinguished from one another according to the range of within which a particular quarter falls, as indicated in the PARTITION BY RANGE clause. The query that forms the MV follows the AS keyword. As indicated in the SELECT clause, the total of the amount sold during a given quarter at a particular city is presented. The state within which the state is located and the year within which the quarter is included is placed in the MV along with the sales information. Additionally a grouping ID, gid, which uniquely corresponds to the calendar year, quarter, state, and city, is also provided. As indicated in the FROM clause, the information associated with the amount sold, the city, state, quarter, year, and gid is taken from the sales, time, and customer tables. As indicated in the WHERE clause, the rows containing the appropriate information is determined by using the time_, id columns as a join key for correlating the information in the sales and time tables, and by using the cust_, id as the join key for correlating the information in the customer and sales tables. As indicted in the GROUP BY clause, the information presented is grouped according to year and quarter, and a ROLLUP is performed on the state and city. Accordingly, for each quarter, first the sales for each city are presented grouped according to state, then the total of sales for each state having null values in the column for the city are presented, and then a grand total of the sales for all states is presented.

Assume that the partition SALES_, Q1_2002, of the detail table SALES undergoes several DML operations, where the partition SALES_, Q1_2002, includes the sales information for the first quarter of 2002. In order to perform a PCT refresh of the MV, the data contained in the affected quarter may be recomputed. In this example, assume that the time dimension is denormalized, because the time information of the time table is repeated in other tables. Despite the null values in the rolled up state and city columns, a join dependent refresh may be performed using the non-rolled up columns, which are the quarter and year. Recomputing the affected quarter may be performed by the following statements. First, as part of the delete phase, the following statements are automatically generated and run.

```
DELETE FROM ru_cube_quarter_mv
WHERE (year, quarter) IN
    (SELECT calendar_year, calendar_quarter_desc
```

```
    FROM times
    WHERE time_id >= TO_DATE('01-MAR-2002','DD-MON-YYYY')
    AND time_id < TO_DATE('01-APR-2002','DD-MON-YYYY')
    )
```

In the above statement, the FROM clause identifies the Mv form which data will be deleted as ru_, cube_, quarter_, my. The WHERE clause contains the IN sub-query that identifies the partitions from which information needs to be deleted. The IN sub-query includes an <exp_, list> having "year" and "quarter" as non-rolled up expressions. In this case, the expression year is just a name for the column calendar_, year, and the expression quarter is just a name for the column calendar_, quarter_, desc. The columns calendar_, year and calendar_, quarter_, desc (referenced by "year" and "quarter") are listed in the <exp_, list> of the SELECT clause. The columns year and quarter are found in the times table, where the times table is the only table listed in the <tab_, list> of the FROM clause. The partition of the time table that is being modified is identified by the <part_, pred>, which is time_, id <TO_, DATE('1, Apr. 2002','DD-MON-YYYY'). Assuming that the quarter of 2002, SALES_, Q1_2002, began on January 1$^{st}$, and ended on March 31$^{st}$, the <part_, pred> predicate identifies the first quarter of 2002, as the changed partition from which data is to be deleted. The <join_, pred> predicate, time_, id>=TO_, DATE('1 Mar. 2002','DD-MON-YYYY'), identifies the rows to be deleted within the partition corresponding the first quarter of 2002, which are the rows having time_, ids that correspond to times within the month of March. Thus, during the above delete phase the rows in the MV ru_, cube_, quarter_, mv that are affected by the dates between Mar. 1, 2002, and Apr. 1, 2002, are deleted.

Then, as the Insert Phase, the following statements may be automatically generated and run.

```
    INSERT INTO ru_cube_quarter_mv
    SELECT /*+ SUBQ_DYN_PRUNE(*) */
        calendar_year year, calendar_quarter_desc quarter,
        cust_state_province state, cust_city city,
        sum(amount_sold) sum_amt,
        grouping_id(calendar_year, calendar_quarter_desc,
        cust_state_province, cust_city) gid
    FROM sales s, times t, customer c
    WHERE s.time_id=t.time_id AND s.cust_id=c.cust_id AND
        (t.calendar_year, t.calendar_quarter_desc) IN
            (SELECT calendar_year, calendar_quarter_desc
            FROM times t
            WHERE time_id >= TO_DATE('01-MAR-2002','DD-MON-
            YYYY') AND time_id < TO_DATE('01-APR-2002','DD-
            MON-YYYY')
            )
    GROUP BY
        calendar_year, calendar_quarter_desc,
        rollup(cust_state_province, cust_city);
```

In the above statement, the INSERT INTO clause identifies the MV into which the insert is being performed as ru_, cube_, quarter_, mv. The optimizer hint, /*+ SUBQ_, DYN_, PRUNE(*) */performs dynamic partition pruning on the detail table, "sales", which will be discussed below. Except for the optimizer hint, /*+ SUBQ_, DYN_, PRUNE(*) */, the SELECT clause is the same as that of the original MV. Similarly, the FROM clause "FROM sales s, times t, customer c" and the GROUP BY clause are the same as the original query. Additionally, up until the second AND operator, the WHERE clause is identical to the WHERE clause of the original MV. Accordingly, the computation performed for refreshing the MV and the layout are identical to that of the original Mv. However, as indicated by the second AND operator, the computations performed for updating the MV are only performed for those rows identified by the IN sub-query. The IN sub-query is used to find the rows affected by the changes, and only those rows found are recalculated and inserted into the MV. In an embodiment, the refresh expression depends only on the join graph of the defining query and does not necessarily depend on any declared functional dependencies.

Dynamic partition pruning is forced using the SUBQ_, DYN_, PRUNE(*) hint, which leads to pruning the partitioned table sales, using predicates on the dimension table, times. The hint SUBQ_, DYN_, PRUNE(*) performs partition pruning on any partitioned table using predicates on any table joined directly or through other tables to the partitioned table.

MV With a Level from a Normalized Dimension

Consider the materialized view, MV2, below.

```
MV2
CREATE MATERIALIZED VIEW ru_cube_quarter_mv_1
PARTITION BY RANGE (quarter)
(
    partition P98Q1 values less than '1998-Q1',
    partition P98Q2 values less than '1998-Q2',
    ....
)
AS
SELECT t_y.calendar_year year, t_q.calendar_quarter_desc quarter,
    cust_state_province state, cust_city city,
    sum(amount_sold) sum_amt
FROM sales s, times_day t_d, times_mon t_m, times_qtr t_q,
    times_year t_y, customer c
WHERE s.time_id = t_d.time_id AND
    t_d.calendar_month_desc = t_m.calendar_month_desc AND
    t_m.calendar_qtr_desc = t_q.calendar_qtr_desc AND
    t_q.calendar_year = t_y.calendar_year AND
    s.cust_id=c.cust_id
GROUP BY
    t_y.calendar_year, t_q.calendar_quarter_desc,
    ROLLUP(cust_state_province, cust_city);
```

Since the tables are normalized, information about the month, quarter, and year are found in tables times_, mon, times_, qtr, and times_, year, respectively, and is not found elsewhere. Similar to the denormalized example, the CREATE clause identifies the name of the MV being created as ru_, cube_, quarter_, mv_, 1, and initiates the creation of the MV. The data within the normalized MV will be partitioned in the same manner as the denormlized example, as indicated by the use of the same PARTITION BY RANGE clause. As indicated in the SELECT clause, the total of the amount sold during a given quarter at a particular city is presented along with the sales information of the state within which the city is located and the year within which the quarter is included is also included, as in the denormalized example.

However, unlike the denormalized example, the column containing the year, calendar_, year, and the column containing the quarter, calendar_, qtr_, desc, are found in and therefore taken from different tables, which are t_, y and t_, q, respectively, listed in the SELECT clause. Additionally, unlike the denormalized example, in this example there is no grouping ID. As indicated in the FROM clause, the information associated with the amount sold, the city, state, quarter, year, is taken from the sales and customer tables, similar to the denormalized example.

In the above normalized example, the times_, day, times_, mon, times_, yr, and times_, qtr are used for obtaining the information about the month, year, and quarter, whereas in the denormalized example, the same information was obtained from one table, the times table. As indicated in the WHERE clause, the rows containing the appropriate information is determined by first using the time_, id columns as a join key for correlating the information in the sales and times_, day tables. Second, the calendar_, month_, desc columns are used as a join key for correlating the information in the times_, mon and times_, day, which gives the month information. Third, the calendar_, year columns are used as a join key for correlating the information in the times_, mon and times_, yr tables, which gives the year information. Finally, the calendar_, quarter columns are used as a join key for correlating the information in the times_, qtr and times_, yr tables, which gives the quarter information. The GROUP BY clause of the normalized and denormalized examples organize the information presented in the same manner. Specifically, for each quarter, first the sales for each city are presented grouped according to state, and then the total of sales for each state is presented. When presenting the totals for each state, null values are placed in the column for the city. A grand total of the sales for all states is presented having null values in the state and city columns.

An example of a statement of a delete phase, which may be automatically generated and run, of a refresh expression that refreshes the Mv of MV2, is as follows.

```
DELETE FROM ru_cube_quarter_mv_1
WHERE year, quarter IN
    (SELECT calendar_year, calendar_quarter_desc
    FROM times_day t_d, times_mon t_m, times_qtr t_q,
        times_year t_y
    WHERE t_d.calendar_month_desc = t_m.calendar_month_desc
        AND t_m.calendar_qtr_desc = t_q.calendar_qtr_desc AND
        time_id >= TO_DATE('01-MAR-2002','DD-MON-YYYY') AND
        time_id < TO_DATE('01-APR-2002','DD-MON-YYYY')
    )
```

The above delete statement differs from that of the denormalized delete statement in that the information being deleted was originally taken from more tables. Accordingly, in identifying the rows that need to be deleted, the tables from which the information was taken (i.e., times_, day t_, d, times_, mon t_, m, times_, qtr t_, q, times_, year t_, y) are identified in the FROM clause, and the WHERE clause includes additional <join_, pred> predicates (t_, d.calendar_, month_, desc=t_, m.calendar_, month_, desc and t_, m.calendar_, qtr_, desc=t_, q.calendar_, qtr_, desc), which indicate the manner in which the information found in these different tables is correlated.

The insert phase may be performed by automatically generating and running the following statement.

```
INSERT INTO ru_cube_quarter_mv_1
SELECT /*+ SUBQ_DYN_PRUNE(*) */
    t_y.calendar_year year, t_q.calendar_quarter_desc quarter,
    cust_state_province state, cust_city city,
    sum(amount_sold) sum_amt
FROM sales s, times_day t_d, times_mon t_m, times_qtr t_q,
    times_year t_y, customer c
WHERE s.time_id = t.time_id AND
    t_d.calendar_month_desc = t_m.calendar_month_desc AND
    t_m.calendar_qtr_desc = t_q.calendar_qtr_desc AND
    t_q.calendar_year = t_y.calendar_year AND
    s.cust_id = c.cust_id AND
    (t_y.calendar_year, t_q.calendar_quarter_desc) IN
        (SELECT calendar_year, calendar_quarter_desc
        FROM times_day t_d, times_mon t_m, times_qtr t_q,
            times_year t_y
        WHERE t_d.calendar_month_desc = t_m.calendar_month_desc
            AND t_m.calendar_qtr_desc = t_q.calendar_qtr_desc
            AND t_q.calendar_year = t_y.calendar_year
            AND time_id >= TO_DATE('01-MAR-2002','DD-MON-YYYY')
            AND time_id < TO_DATE('01-APR-2002','DD-MON-YYYY')
        )
GROUP BY
    calendar_year, calendar_quarter_desc,
    ROLLUP(cust_state_province, cust_city);
```

In the above INSERT statement, the sub-query predicate identifying the affected rows is as follows.

```
(t_y.calendar_year, t_q.calendar_quarter_desc) IN
    (SELECT calendar_year, calendar_quarter_desc
    FROM times_day t_d, times_mon t_m, times_qtr t_q,
        times_year t_y
    WHERE t_d.calendar_month_desc = t_m.calendar_month_desc
        AND t_m.calendar_qtr_desc = t_q.calendar_qtr_desc
        AND t_q.calendar_year = t_y.calendar_year
        AND time_id >= TO_DATE('01-MAR-2002','DD-MON-YYYY')
        AND time_id < TO_DATE('01-APR-2002','DD-MON-YYYY')
    )
```

Similar to the denormalized example, in the normalized example, the INSERT statement includes the original query upon which the MV was based, except the SELECT statement includes the optimizer hint SUBQ_, DYN_, PRUNE(*) (*), and the predicates of the WHERE clause are additionally ANDed with the results of IN sub-query, so that only the rows identified by the IN sub-query are recomputed and refreshed.

As above, as a result of the SUBQ_, DYN_, PRUNE(*)(*) hint, dynamic partition pruning is performed on the "sales" table using the IN predicate on the tables "times_, year" and "times_, qtr".

Join Dependencies Based PCT Refresh Using Truncate

A join based PCT refresh using TRUNCATE (instead of DELETE) may be used (1) if the refresh is non-atomic, (2) if the MV is partitioned according to a range of values or list of values at the top level, and (3) if (a) all the partitioning columns for a range, list, or range-list partitioning schemes, or just the top level partitioning columns for range-hash or range-list partitioning schemes are join dependent on the partitioning columns of a changed detail table or a set of equivalent changed tables, and (b) no other table has changed.

A join dependent refresh using TRUNCATE may also be used if more than one table changed. However, when more than one table changes, the Primary Key-Foreign Key (PK-FK) optimization on insert can be utilized to simplify the refresh. For example, consider two tables, F (d1, d2, sales), and D(d2, d3). Assume that d2 is a primary key of D, and F is related to D by a PK-FK relationship on column d2. Assume that F is partitioned on d2, where d2 is a foreign key, and D is not partitioned, where d2 is a primary key. In such a case, a join dependent refresh may be performed if some partitions of F change, but D does not change at all. However, if INSERTS are done in D, then there is no need to do anything as part of the refresh, because the PK-FK relationship ensures that there was no row in F that could have joined to these newly inserted rows, because the newly inserted rows correspond to rows of partitions that are not in F. Also, if some rows are deleted from D, the presence of PK-FK relationship means that the corresponding rows in F should also be deleted. Consequently, deleted rows on the table D can be ignored, thereby enabling a join dependent refresh to be performed. Hence, the presence of PK-FK relationship allows join dependent refresh to be performed in cases where the join dependent table (in this case D) has had only DELETEs or INSERTs. If the MV is also partitioned, a TRUNCATE based join dependent refresh may also be performed.

If there are window functions in a select list or a spreadsheet clause, the PARTITION BY expressions of the window function or spreadsheet clauses should include a common subset of the top level range/list partitioning columns of the MV. The TRUNCATE operation may remove significantly more data than the DELETE operation, but may still be much faster than the corresponding DELETE operation, because an entry into a MV log is made as part of the DELETE operation, and an entry in the MV log is not made during the TRUNCATE operation. When using TRUNCATE, the INSERT statement may recompute more data than the corresponding DELETE operation. The decision to choose whether to use a join dependent refresh using DELETE or a join dependent refresh using TRUNCATE may be a cost based as discussed in regard choosing whether use a PCT refresh using TRUNCATE or DELETE in U.S. patent application Ser. No 60/562, 401, entitled, "USING OPTIMIZER COST TO REFRESH A SET OF MATERIALIZED VIEWS (MVS)".

The join dependent refresh using TRUNCATE also includes of two phases, but the first phase uses TRUNCATE, instead of DELETE, to remove the changed rows from the materialized view. To obtain a list of partitions to be truncated, a list of changed partitions is obtained using a query, which may be automatically generated and run, having the following syntax.

```
SELECT DISTINCT TBL$OR$IDX$PART$NUM(<mv_name>, 0,
    <dimension>, 65535, <exp_list>)
FROM (SELECT <exp_list>
    FROM <tab_list>
    WHERE <join_pred> AND <part_pred>
)
```

In the above expression, <mv_, name> is the name of the materialized view being refreshed, the <dimension> is a logical variable indicating whether all the partitioning columns or only the top level partitioning columns of a materialized view partitioned using range, list, or range-list partitioning schemes are functionally dependent on the partitioning columns of the changed table or a set of equivalent changed tables, <exp_, list> is a list of expressions corresponding to all the partitioning columns in the materialized view, <tab_, list> is a list of tables whose expressions are referenced in <exp_, list> and in other tables that link the tables in <exp_, list> to the changed detail tables, <join_, pred> is a predicate that joins the tables in <tab_, list>, <part_, pred> is a predicate identifying the changed partitions in the detail table.

In an embodiment, the value of <dimension> is set to a particular value, such as 0, if all the partitioning columns of the MV that are partitioned using range, list, or range-list partitioning schemes are functionally dependent on the partitioning columns of the changed table or a set of equivalent changed tables. The value of <dimension> is set to another value, such as 1, if only the top level partitioning columns of the materialized view partitioned using range-hash/range-list partitioning schemes are functionally dependent on the partitioning columns of the changed table or a set of equivalent changed tables.

In the above statement, the function TBL$OR$IDX$PART$NUM maps a row associated with a table or index to a partition, and returns the partition number. This function is used to return the partition number associated with a global index or table to which a given row belongs. For example, TBL$OR$IDX$PART$NUM may have the following syntax.

```
TBL$OR$IDX$PART$NUM (map a row to a partition) function
TBL$OR$IDX$PART$NUM(
    <table_name>,
    <idx_objn>,
    <dimension>,
    <range_partnum>,
    <part_exp_list>)
``` where the input parameter <table_, name> is name of the table from which the partition numbers are being obtained, the input parameter <idx_, objn> is the object number of a global index, if expressions for secondary partitioning are sought, the input parameter <range_, partnum> is the partition number of range of the partition to which the row belongs, otherwise <range_, partnum> is set to a particular value, which in this embodiment is 65535, the input value of <part_, exp_, list> is a list of values of rows that will be mapped to a partition number. The <part_, exp_, list> will include expressions for all partitioning columns if <dimension> is equal to a first value. The <part_, exp_, list> will include expressions for only the top level partitioning columns if <dimension> is equal to a second value. The <part_, exp_, list> will include expressions for secondary level partitioning if <dimension> is equal to a third value. In an embodiment the first second and third values are 0, 1, and 2, but could be any other three values in alternative embodiments.

In an embodiment, the parameter <idx_, objn> specifies whether the object number returned is a partition or a table. If a row is being mapped to an index, then the value of the input parameter <idx_, objn> is a first particular value, such as 0. If a row is being mapped to a table, then the value of the input parameter <idx_, objn> is a second particular value, such as 1.

The input parameter <dimension> should be set to the first value (e.g., 0) when finding the absolute partition number (e.g. the partition number of a range, hash, list, range-hash, or range-list). The input parameter <dimension> should be set to the second value (e.g., 1) when finding the top level partition number (range for range-hash or range-list), and should be set to the third value (e.g., 2) when finding the secondary level partition number.

When using a join dependent refresh using TRUNCATE, after changes are made to a set of equivalent tables, if a list of partitions of the MVs are being identified, the query is generated by picking a sub-query corresponding to one of the partitions. A more complicated query that includes all the equivalent tables may also be generated. Once the partitions and/or subpartitions have been identified, the partition and/or subpartitions names are obtained. The names of the partitions and/or subpartitions are used to generate TRUNCATE statements for the partitions and/or subpartitions having those names. The predicates of the changed partitions are also obtained, and are added to the predicates in the INSERT clause of the refresh statement.

The hint SUBQ_, DYN_, PRUNE(*) may be used to force partition pruning on the detail tables. Since the MV is partitioned and the changed partitions have been identified, a MULTIPLE TABLE INSERT may be used on each of the identified partitions to cause partition pruning to be performed on the MV.

The partition pruning may improve Parallel Querying (PQ) distribution for the inserts. Specifically, while doing PQ, each slave is allocated one or more partitions to work on. If there is no partition pruning or partition pruning is poor, some slaves may be allocated to work on partitions that have not changed, which can lead to an unbalanced load distribution amongst the slaves. Hence, PQ may be improved by partition pruning by enabling a more balanced load distribution amongst slaves.

Materialized View with a Level from Denormalized Dimension

Consider the materialized view "ru_, cube_, quarter_, mv" defined in MV1, above. As above, assume that the time dimension is denormalized. Also, as above, assume that partition SALES_, Q1_2002, of the detail table, "sales", undergoes one or more of DML operations. In a join dependent refresh of the MV, the data contained in the affected quarter is recomputed. To find the affected quarters, the following query may be automatically generated and run.

```
SELECT DISTINCT TBL$OR$IDX$PART$NUM
    ('ru_cube_quarter_mv', 0, 0, 65535, quarter)
FROM (SELECT calendar_quarter_desc quarter
    FROM times
    WHERE time_id >=
        TO_DATE('01-MAR-2002','DD-MON-YYYY') AND
        time_id < TO_DATE('01-APR-2002','DD-MON-YYYY')
    )
ORDER BY 1
```

The set of partitions returned by the above query may be used to obtain the name of partitions to be truncated and to generate the predicate for the INSERT query. Without the DISTINCT duplicate values of some partitions may be returned. The DISTINCT clause may be included in the inner query, because evaluation of TBL$OR$IDX$PART$NUM function is expensive. By using the DISTINCT only unique values of partitions are returned, and the TBL$OR$IDX$PART$NUM function is evaluated only once to for each partition number. The ORDER BY 1, causes the result rows to be ordered by the first column. In this particular case, it means ordering by the partition numbers.

For example, the truncate phase may be implemented by automatically generating and running the following statement.

ALTER TABLE ru_, cube_, quarter_, mv TRUNCATE PARTITION P02Q1;

The ALTER TABLE clause identifies the MV being altered, ru_, cube_, quarter_, mv. The TRUNCATE PARTITION clause specifies that the manner that the MV is altered is via a TRUNCATE, and that the PARTITION to which the TRUNCATE is applied is P02Q1. The insert phase may then be implemented using the following statement.

```
INSERT INTO ru_cube_quarter_mv PARTITION P02Q1
    SELECT /*+ SUBQ_DYN_PRUNE(*) */
        calendar_year year, calendar_quarter_desc quarter,
        cust_state_province state, cust_city city,
        sum(amount_sold) sum_amt,
        grouping_id(calendar_year, calendar_quarter_desc,
        cust_state_province, cust_city) gid
    FROM sales s, times t, customer c
    WHERE s.time_id=t.time_id AND s.cust_id=c.cust_id AND
        t.calendar_quarter_desc < '2002-Q2' AND
        t.calendar_quarter_desc >= '2002-Q1'
    GROUP BY
        calendar_year, calendar_quarter_desc,
        ROLLUP(cust_state_province, cust_city);
```

The partition into which the INSERT is performed is specified by the PARTITION P02Q1, clause. Otherwise, the above INSERT statement includes the entire query upon which the MV being updated is based, and consequently the newly computed and inserted data is a refreshed version of the old data. In the above statement, the SUBQ_, DYN_, PRUNE(*) hint and the predicate "t.calendar_, quarter_, desc<'2002-Q2'AND t.calendar_, quarter_, desc>='2002-Q1'" in the WHERE clause is used to cause partition pruning of the detail table "sales". The predicate "t.calendar_, quarter_, desc<'2002-Q2'AND t.calendar_, quarter_, desc>='2002-Q1'" specifies the same period of time as is covered by PARTIONT P02Q1. Additionally, pruning may be enabled on the MV by using a multi-table insert. In this example, there is a single partition, so the partition being refreshed may be specified by placing the partition name into the INSERT statement after the PARTITION key word.

Materialized View with a Level from Normalized Dimension

A materialized view ru_, cube_, quarter_, mv_, 1, MV3, may be created using the following statement.

```
MV3
CREATE MATERIALIZED VIEW ru_cube_quarter_mv_1
PARTITION BY YEAR
(
PARTITION P1 VALUES LESS THAN (1999),
PARTITION P2 VALUES LESS THAN (2000),
PARTITION P3 VALUES LESS THAN (2001),
PARTITION P4 VALUES LESS THAN (2002),
PARTITION P5 VALUES LESS THAN (2003),
PARTITION P6 VALUES LESS THAN (MAXVALUE)
)
AS
SELECT t_y.calendar_year year, t_q.calendar_quarter_desc quarter,
    cust_state_province state, cust_city city,
    sum(amount_sold) sum_amt
    from sales s, times_day t_d, times_mon t_m, times_qtr t_q,
    times_year t_y, customer c
WHERE s.time_id = t_d.time_id and
    t_d.calendar_month_desc = t_m.calendar_month_desc and
    t_m.calendar_qtr_desc = t_q.calendar_qtr_desc and
    t_q.calendar_year = t_y.calendar_year and
    s.cust_id=c.cust_id
GROUP BY
    t_y.calendar_year, t_q.calendar_quarter_desc,
    ROLLUP(cust_state_province, cust_city);
```

Assume that in addition to the partition SALES_, M3_2002, of the "sales" table, the partition SALES_, M12_2001, is also changed. The affected partitions of the materialized view may be computed by automatically generating and running the following query.

```
SELECT DISTINCT TBL$OR$IDX$PART$NUM
    ('ru_cube_month_mv', 0, 0, 65535, year)
FROM (SELECT calendar_year
    FROM times_day t_d, times_mon t_m, times_qtr t_q,
    times_year t_y
    WHERE t_d.calendar_month_desc = t_m.calendar_month_desc and
        t_m.calendar_qtr_desc = t_q.calendar_qtr_desc and
        t_q.calendar_year = t_y.calendar_year and
        (
        (time_id >= TO_DATE('01-MAR-2002','DD-MON-YYYY')
            AND
        time_id < TO_DATE('01-APR-2002','DD-MON-YYYY'))
        OR
        (time_id >= TO_DATE('01-DEC-2001','DD-MON-YYYY')
            AND
        time_id < TO_DATE('01-JAN-2002','DD-MON-YYYY'))
        )
    )
ORDER BY 1
```

The above statement includes two <join_, pred> predicates, which are time_, id>=TO_, DATE('1, Mar. 2002','DD- MON-YYYY') and time_, id>=TO_, DATE('1, Dec. 2001', 'DD-MON-YYYY'), and two <part_, pred> predicates, which are time_, id<TO_, DATE('1, Arp. 2002','DD-MON-YYYY') and time_, id<TO_, DATE('1, Jan. 2002','DD-MON-YYYY') to identify both affected partitions. A corresponding refresh expression may be performed by performing a truncate phase followed by an insert phase. In this example, two partitions of MV3 are affected, which are P3 and P4. First, the two affected partitions are truncated by issuing two TRUNCATE statements. Then, a multi-table insert is used to recompute the affected partitions, P3 and P4. Specifically, the truncate phase may be performed by automatically generating and running following statements.

ALTER TABLE ru_, cube_, quarter_, mv_, 1 TRUNCATE PARTITION P3;
ALTER TABLE ru_, cube_, quarter_, mv_, 1 TRUNCATE PARTITION P4;

Each partition is truncated using a different statement. Next, the insert phase may be automatically generating and running the following statement.

```
INSERT FIRST
WHEN (year >= 2001 AND year < 2002)
    THEN INTO
        ru_cube_quarter_mv_1(year, quarter, state, city, sum_amt)
        PARTITION P3 VALUES (year, quarter, state, city, sum_amt)
    ELSE INTO
        ru_cube_quarter_mv_1(year, quarter, state, city, sum_amt)
        PARTITION P4 VALUES (year, quarter, state, city, sum_amt)
SELECT /*+ SUBQ_DYN_PRUNE(*) */
    t_y.calendar_year year, t_q.calendar_quarter_desc quarter,
    cust_state_province state, cust_city city,
    sum(amount_sold) sum_amt
FROM sales s, times_day t_d, times_mon t_m, times_qtr t_q,
    times_year t_y, customer c
WHERE s.time_id = t.time_id and
    t_d.calendar_month_desc = t_m.calendar_month_desc and
    t_m.calendar_qtr_desc = t_q.calendar_qtr_desc and
    t_q.calendar_year = t_y.calendar_year and
    s.cust_id = c.cust_id and
    ((t_y.calendar_year >= 2001 AND t_y.calendar_year < 2002) OR
    (t_y.calendar_year >= 2002 AND t_y.calendar_year < 2003))
GROUP BY
    calendar_year, calendar_quarter_desc,
    ROLLUP(cust_state_province, cust_city);
```

In the above multi-table INSERT, a WHEN clause specifies the predicate year >=2001 AND year <2002. The predicate of the WHEN clause distinguishes between the two partitions. If the year of the row to be inserted satisfies the predicate year >=2001, AND year <2002, then the row belongs to partition P3, and the THEN INTO clause is applicable. Otherwise, the row to be inserted belongs to the partition P4, and the clauses of the ELSE INTO clause are applicable. In both the ELSE INTO and the THEN INTO, first the MV into which the rows are being inserted and the values of the MV's select list are identified. Then the partition (which in this example is P3 or P4) and the values within the partition that are being refreshed are identified.

The keyword FIRST is not necessary, because the conditions under which the insert is performed are unique. However, the keyword FIRST improves performance by explicitly indicating that the server should perform the insert into the first destination table that satisfies the specified conditions instead of checking all possible destinations to see if the condition is satisfied.

Next, the INSERT phase uses a modified version of the query that defined MV3. The modified version of the query that defined the MV include the SUBQ_, DYN_, PRUNE(*) hint and the predicate "((t_, y.calendar_, year>=2001, AND t_, y.calendar_, year<2002) OR (t_, y.calendar_, year>=2002, AND t_, y.calendar_, year<2003))", which cause partition pruning to be performed on the "sales" table. Additionally, the insert into the multi-table partitions causes partition pruning on the materialized view "ru_, cube_, quarter_, mv_1", MV3.

Refresh Using Query Rewrite in Trusted Mode

An MV may be refreshed in TRUSTED mode using a join dependent refresh. Specifically, if an MV is allowed to use TRUSTED constraints for refresh, several of the refresh expressions described above can be rewritten against MVs that are fresh. For example, if there is an MV "ru_, cube_, day_, mv" that has already been refreshed, the INSERT refresh expression may be rewritten as

```
INSERT INTO ru_cube_quarter_mv PARTITION P02Q1
SELECT /*+ SUBQ_DYN_PRUNE(*) */
    calendar_year year, calendar_quarter_desc quarter,
    cust_state_province state, cust_city city,
    sum(amount_sold) sum_amt,
    grouping_id(calendar_year, calendar_quarter_desc,
    cust_state_province, cust_city) gid
FROM ru_cube_day_mv mv, times t
WHERE mv.gid = 0 AND
    mv.day = t.time_id AND
    t.calendar_quarter_desc < '2002-Q2' AND
    t.calendar_quarter_desc >= '2002-Q1'
GROUP BY
    calendar_year, calendar_quarter_desc,
    ROLLUP(cust_state_province, cust_city);
```

This expression uses a join back of MV "ru_, cube_, day_, mv" with the "times" table to get the month values "calendar_, quarter_, desc" and year values "calendar_, year", which is quicker than obtaining the same information from the original base tables. The resulting data is, then, rolled up to get the quarter level values. Rewrite may be enabled with "rewrite_, integrity" set to TRUSTED if the MV, "ru_, cube_, quarter_, mv", is allowed to use TRUSTED constraints during refresh.

If the "query_, rewrite" is enabled for the refresh session, the query rewrite engine may automatically rewrite an MV against the already fresh MVs. If "rewrite_, integrity" is also set to TRUSTED join backs are used.

Hardware Overview

Figure 3:
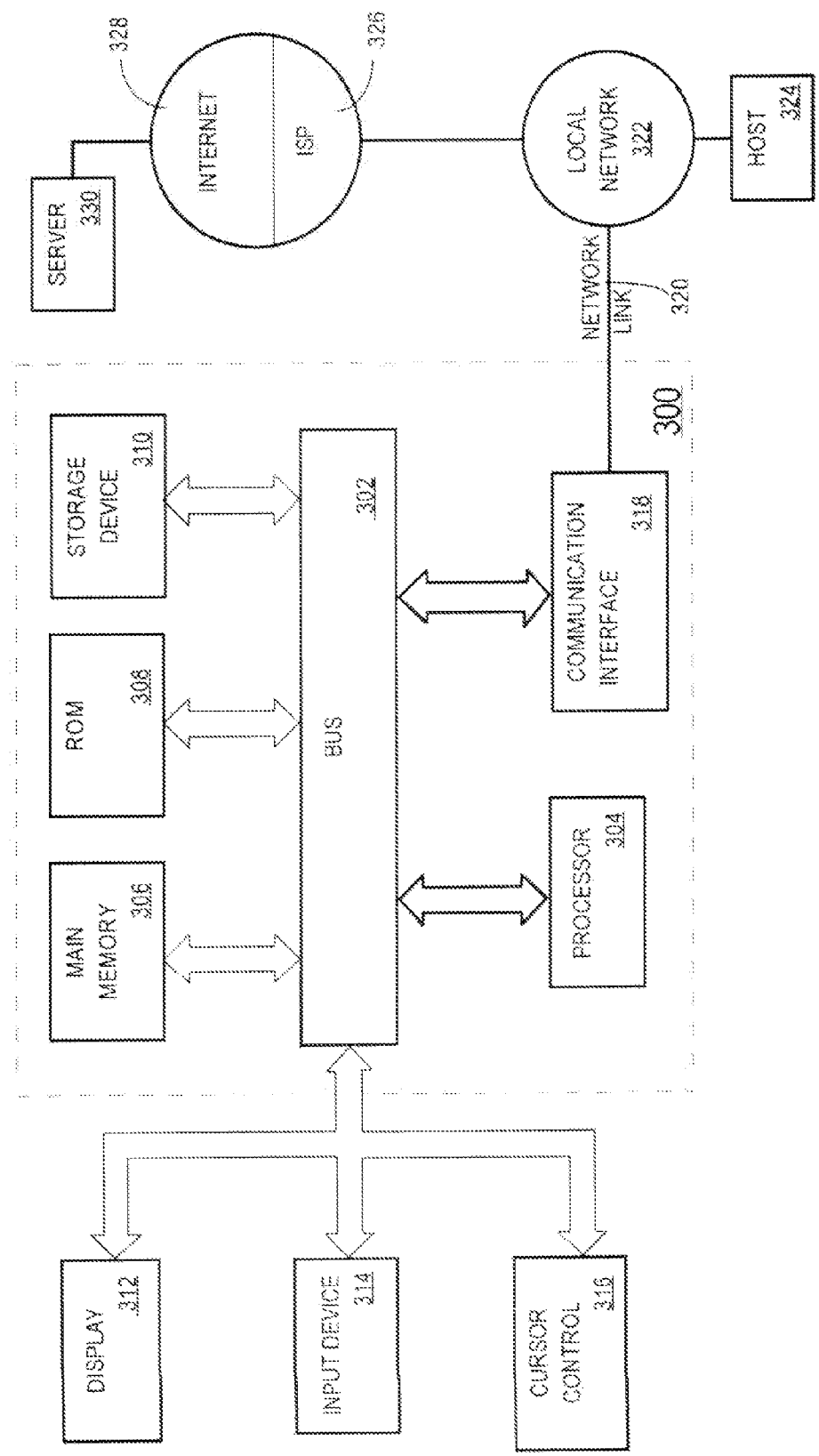
FIG. 3 is a block diagram that illustrates a computer system that may be used in implementing an embodiment of the present invention.

FIG. 3 is a block diagram that illustrates a computer system 300 upon which an embodiment of the invention may be implemented. Computer system 300 may be used as a database and/or database server or a separate unit for the database and database server. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for performing a join dependent refresh by for example running a database server capable of performing a join dependent refresh. Computer system 300 is just one example of a machine for performing a join dependent refresh. According to one embodiment of the invention, reducing costs associated refreshing a set of one or more materialized views is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein in one example of a "machine-readable medium", and refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire, and fiber optics, including the wires or other transmission media that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, a EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304. Computer readable media are just one example of machine-readable media that may be used for carrying the instructions for implementing any of the methods described herein.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320, and communication interface 318. In the Internet example, a server 330 might transmit a requested code for an application program through Internet 328, ISP 326, local network 322, and communication interface 318. In accordance with the invention, one such downloaded application provides for reducing costs associated refreshing a set of one or more materialized views as described herein.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

The invention claimed is:

1. A machine-implemented method, comprising:
  evaluating a definition of a materialized view based on a base table, wherein the base table is partitioned into a plurality of partitions based on a partition key;

wherein the step of evaluating includes determining that the definition is based on a join dependency of the partition key of said base table; and based on the evaluating, generating a refresh expression that includes a restriction based on said partition key;

wherein the steps of evaluating and generating are performed by a computing device.

2. The method of claim 1, wherein:

the restriction is based on a predicate expression that identifies a subset of said plurality of partitions; and the refresh expression specifies a delete of operation of rows in the materialized view that correspond to the subset of said plurality of partitions.

3. The method of claim 1, wherein:

the restriction is based on a predicate expression that identifies a subset of said plurality of partitions; and the refresh expression specifies a truncate operation of one or more partitions of the materialized view that correspond to the subset of said plurality of partitions.

4. The method of claim 1, wherein:

the restriction is based on a predicate expression that identifies a subset of said plurality of partitions; and the refresh expression specifies an operation limiting aggregation of rows to rows in a subset of said plurality of partitions, said aggregation producing rows to insert in the materialized view.

5. The method of claim 1, wherein:

evaluating includes determining whether said definition satisfies one or more criteria, said one or more criteria including that the definition defines an expression with a join dependency based on a particular partition key; and generating a refresh expression is performed only if said one or more criteria are satisfied.

6. The method of claim 1, wherein:

evaluating includes determining whether said definition satisfies one or more criteria, said one or more criteria including that the definition references a function performed directly on a particular partition key; and generating a refresh expression is performed only if said one or more criteria are satisfied.

7. The method of claim 1, the refresh expression includes an optimizer hint that causes partition pruning based on the partition key.

8. The method of claim 1, wherein the refresh expression is automatically generated, and the method further comprising automatically executing the refresh expression.

9. The method of claim 1, wherein one or more rows of the materialized view are generated via an aggregation of data in the base table.

10. The method of claim 1, wherein generating of the refresh expression includes at least:

deriving one or more partition identifiers that identify partitions associated with the restriction; and placing the partition identifiers in the refresh expression.

11. A non-transitory machine-readable storage medium storing one or more sequences of instructions, which when executed by one or more processors, causes:

evaluating a definition of a materialized view based on a base table, wherein the base table is partitioned into a plurality of partitions based on a partition key;

wherein the step of evaluating includes determining that the definition is based on a join dependency of the partition key of said base table; and based on the evaluating, generating a refresh expression that includes a restriction based on said partition key.

12. The non-transitory machine-readable storage medium of claim 11, wherein:

the restriction is based on a predicate expression that identifies a subset of said plurality of partitions; and the refresh expression specifies a delete operation of rows in the materialized view that correspond to the subset of said plurality of partitions.

13. The non-transitory machine-readable storage medium of claim 11, wherein:

the restriction is based on a predicate expression that identifies a subset of said plurality of partitions; and the refresh expression specifies a truncate operation of one or more partitions of the materialized view that correspond to the subset of said plurality of partitions.

14. The non-transitory machine-readable storage medium of claim 11, wherein:

the restriction is based on a predicate expression that identifies a subset of said plurality of partitions; and the refresh expression specifies an operation limiting aggregation of rows to rows in a subset of said plurality of partitions, said aggregation producing rows to insert in the materialized view.

15. The non-transitory machine-readable storage medium of claim 11, wherein:

evaluating includes determining whether said definition satisfies one or more criteria, said one or more criteria including that the definition defines an expression with a join dependency based on a particular partition key; and generating a refresh expression is performed only if said one or more criteria are satisfied.

16. The non-transitory machine-readable storage medium of claim 11, wherein:

evaluating includes determining whether said definition satisfies one or more criteria, said one or more criteria including that the definition references a function performed directly on a particular partition key; and generating a refresh expression is performed only if said one or more criteria are satisfied.

17. The non-transitory machine-readable storage medium of claim 11, the refresh expression includes an optimizer hint that causes partition pruning based on the partition key.

18. The non-transitory machine-readable storage medium of claim 11, wherein the refresh expression is automatically generated, and wherein the sequences of instructions further comprise instuctions for automatically executing the refresh expression.

19. The non-transitory machine-readable storage medium of claim 11, wherein one or more rows of the materialized view are generated via an aggregation of data in the base table.

20. The non-transitory machine-readable storage medium of claim 11, wherein generating of the refresh expression includes at least:

deriving one or more partition identifiers that identify partitions associated with the restriction; and placing the partition identifiers in the refresh expression.

* * * * *